(12) United States Patent
Hirchak et al.

(10) Patent No.: US 10,824,805 B2
(45) Date of Patent: Nov. 3, 2020

(54) SYSTEMS AND METHODS FOR AUTOMATED REVIEW AND EDITING OF PRESENTATIONS

(71) Applicant: Astute Review, LLC, Chicago, IL (US)

(72) Inventors: James Hirchak, Chicago, IL (US); Kevin Ponziani, Rocky River, OH (US)

(73) Assignee: Astute Review, LLC, Chicago, IL (US)

( * ) Notice: Subject to any disclaimer, the term of this patent is extended or adjusted under 35 U.S.C. 154(b) by 0 days.

(21) Appl. No.: 16/660,513

(22) Filed: Oct. 22, 2019

(65) Prior Publication Data

US 2020/0125633 A1    Apr. 23, 2020

Related U.S. Application Data

(60) Provisional application No. 62/748,909, filed on Oct. 22, 2018.

(51) Int. Cl.
| | |
|---|---|
| *G06F 40/00* | (2020.01) |
| *G06F 40/253* | (2020.01) |
| *G06F 3/0482* | (2013.01) |
| *G06F 40/103* | (2020.01) |
| *G06F 40/166* | (2020.01) |

(52) U.S. Cl.
CPC .......... *G06F 40/253* (2020.01); *G06F 3/0482* (2013.01); *G06F 40/103* (2020.01); *G06F 40/166* (2020.01)

(58) Field of Classification Search
None
See application file for complete search history.

(56) References Cited

U.S. PATENT DOCUMENTS

| | | |
|---|---|---|
| 7,428,704 B2 | 9/2008 | Baker et al. |
| 7,607,089 B2 | 10/2009 | Baker et al. |
| 8,225,208 B2 | 7/2012 | Sprang et al. |

(Continued)

OTHER PUBLICATIONS

Spicer et al., "A Slide-Ware Application to Support Discursive Presentations" MM'09, Oct. 19-24, 2009, Beijing, China, p. 971-972. (Year: 2009).*

(Continued)

*Primary Examiner* — Amelia L Tapp
(74) *Attorney, Agent, or Firm* — K&L Gates LLP

(57) ABSTRACT

An automated presentation review system includes a controller in communication with a user device, the user device comprising an input mechanism and a display mechanism, a memory coupled to the controller. The controller displays a graphical user interface through which a presentation review window is displayed. The presentation review window simultaneously provides a presentation display frame displaying a presentation comprising plurality of presentation slides, a review criteria tool displaying a plurality of review criteria options, and a results display frame. The controller then receives a selection one or more review criteria options from the plurality of review criteria options, and, in response to the receipt of the selected review criteria options, display results of an analysis of the presentation based on the selected review criteria options, wherein the display of the analysis includes one or more icons signifying an inconsistency identified in the presentation across the plurality of presentation slides.

10 Claims, 7 Drawing Sheets

(56) References Cited

U.S. PATENT DOCUMENTS

| | | |
|---|---|---|
| 8,578,346 B2 | 11/2013 | Chao et al. |
| 8,775,918 B2 | 7/2014 | Livshin et al. |
| 9,213,682 B1 | 12/2015 | Guth et al. |
| 9,430,479 B2 | 8/2016 | Sprang et al. |
| 9,495,348 B2 | 11/2016 | Bastide et al. |
| 9,633,008 B1 | 4/2017 | Brand et al. |
| 9,747,326 B2 | 8/2017 | Tanba et al. |
| 10,460,023 B1* | 10/2019 | Shriven .................. G06F 40/14 |
| 2005/0108619 A1* | 5/2005 | Theall .................... G06F 16/48 |
| | | 715/229 |
| 2006/0294046 A1* | 12/2006 | Sareen .................. G06F 40/169 |
| 2009/0319927 A1 | 12/2009 | Beeman et al. |
| 2010/0031152 A1* | 2/2010 | Villaron ................ G06F 3/0481 |
| | | 715/731 |
| 2011/0314361 A1 | 12/2011 | Chen et al. |
| 2018/0300304 A1* | 10/2018 | Mullins .................. G06Q 10/10 |
| 2019/0171873 A1* | 6/2019 | Northrup ............. G06K 9/6262 |

OTHER PUBLICATIONS

Beamer et al., "Investigating Automatic Alignment Methods for Slide Generation from Academic Papers" Proceedings of the Thirteenth Conference on Computational Natural Language Learning (CoNLL), pp. 111-119, Boulder, Colorado, Jun. 2009, copyright 2009 Association for Computational Linguistics. (Year: 2009).*

* cited by examiner

FIG. 7

SYSTEMS AND METHODS FOR AUTOMATED REVIEW AND EDITING OF PRESENTATIONS

CROSS-REFERENCE TO RELATED APPLICATIONS

This application incorporates by reference and claims priority to U.S. Provisional Patent Application No. 62/748,909 filed Oct. 22, 2018.

BACKGROUND OF THE INVENTION

The present subject matter relates generally to a system and method for the automated review and editing of a digital slide presentation that allows for the identification and efficient resolution of errors or inconsistencies across an entire presentation. More specifically, the present invention relates to both a system and method with components configured to evaluate all objects within a multi-slide presentation for inconsistencies or errors and provide related information and recommended changes to fix issues in a graphical user interface that is easy to navigate and allows for efficient revisioning.

Digital slide presentations, such as, but not limited to, applications like Microsoft® PowerPoint, Apple® Keynote, and Google® Slides, are ubiquitous. Familiarity with these presentations begins at an early age, as they are used in classrooms across the country, and builds across all levels of education, fields, and professions. The efficacy of these presentations in conveying information to audiences means that they are a powerful professional tool, one that has come to occupy a considerable amount of employee time in the U.S.

Accordingly, there is a need for an automated presentation review system to efficiently identify and resolve digital presentation errors as described herein.

BRIEF SUMMARY OF THE INVENTION

To meet the needs described above and others, the present disclosure provides a system and method for an automated presentation review system that (1) reviews a presentation in its entirety by comparing individual slides within a slide deck against one another or against a pre-configured set of standards, (2) categorizes unique content and formatting decisions within a presentation and indicates their prevalence throughout the same, (3) presents this information in a user interface identifying errors, inconsistencies, usage/prevalence of content or formatting decisions, compliance with pre-approved corporate standards, and other details, and (4) allows users to catalog when identified issues are changed or ignored in order to review and potentially undo such actions. The system allows users to review their presentations for errors and inconsistencies through multiple processes: an automated process where each slide in the presentation slide deck is compared against one another, a process where slides are compared against a set of criteria, or where selected slides are reviewed for inconsistencies within the content featured on the slide itself.

In the first example, once a user has opened a presentation to review in the system, a user may choose to perform an automated review of the entire presentation without a limiting set of criteria. To review the presentation, the system will analyze each slide within the slide deck through the following process.

First, the system catalogs each content and formatting decision the user has made within the presentation for each slide in the deck. The system will then statistically analyze this dataset in order to identify inconsistencies and/or errors based on the relative prevalence of a content or formatting decision. In other embodiments, other means for comparison, such as preset or other user-defined formats, may be used to identify inconsistencies.

By providing an automated review that catalogs the characteristics of each slide, the system provides a comprehensive dataset that captures the characteristics of their unique presentations and preferences, allowing users to conduct isolated reviews of single error categories (such as bullets, decimal precision, capitalization, or text wrapping) after a single review, rather than isolating single error categories and running additional reviews limited to a single category. Furthermore, by providing an automated review that compares the characteristics of each slide, the system provides users with detailed insights into errors and inconsistencies within their presentation based on its unique content and a user's unique decisions/preferences rather than predetermined values. In regards to color inconsistencies, for example, the system may benchmark mismatched color against the prevalence of color choices throughout the presentation or against a predetermined color palette.

Using prevalence of content and formatting decisions as a means of identifying potential errors and inconsistencies and calculating potential fixes to the same allows users flexibility in their presentation edits when using the system. For example, a user may prefer to have different title positions on slides (perhaps a title is moved to compensate for a slide image). Rather than identifying the inconsistency and forcing a presentation-wide change to correct it, the system allows the user to gauge how prevalent this formatting decision is in relation to the entire presentation and other identified inconsistencies. The system may also present statistical information such as confidence intervals for error checks in order to ensure maximum consistency in presentation review and editing. One of the advantages of this is that statistical analysis can identify a user's consistent ad hoc formatting that falls outside of a presentation program's vocabulary. Consider footnotes. A user may create text that functions as footnotes within a presentation without using any defined action, such as "insert footnote," within a presentation software (e.g. by reducing font size and numbering a paragraph). The system's statistical analysis may help determine the user's intent to use such formatting as a footnote even though the user is operating outside of the preset actions in a presentation software. This will help the user identify errors or inconsistencies within the context of their own ad hoc formatting. Accordingly, providing users with the context within which (a) errors are identified and (b) fixes are proposed ultimately allows users to have the information and flexibility needed to truly tailor their presentations to a consistent design that matches their particular needs.

In another example, a user runs an automated review based on a set of criteria. In selecting this option, the user specifies the criteria that the system would use to identify inconsistencies or errors. For example, the user may set a criteria that slide titles have an 18 pt font. During review, the system analyzes each slide and identifies each instance where a slide title does not use an 18 pt font. In other words, such an analysis would identify errors based on a lack of conformity with user-identified or other preset criteria rather than prevalence.

In a further example, a user may run a review within a single slide to determine whether there are inconsistencies or errors within the selected slide content. For example, use of a bulleted list, text boxes, or a table within a slide may warrant review for consistent formatting.

Once the analysis is complete, the system generates an alert that includes a description of the issue, based on statistical analysis such as prevalence, confidence intervals, or median/mode values, and one or more correction that may resolve the issue. In one embodiment, this information is presented in a sidebar on the system's user interface. In one embodiment, this sidebar lists the inconsistencies or errors by issue type or by location within the presentation, the issue's context, and icons that are shortcuts to actions to fix, ignore, undo, or otherwise note the status of each inconsistency (e.g. whether a fix has been applied). This sidebar may also offer the user other options for organizing or filtering the system's display of this information. In other embodiments, the information is displayed in a pop-out text box through a series of scrollable alerts in lieu of a sidebar. While the term "sidebar" is used throughout the embodiment described herein, the results may be displayed in any manner, including but not limited to, a header, a series of pop-up text boxes, within the margin of the presentation, or the like.

By analyzing slide formatting across a presentation in its entirety and providing a list of inconsistencies/errors along with recommended fixes in a user-friendly format, the system provides the user with a broad perspective of errors and solutions for the presentation as a whole. Viewing each inconsistency in comparison to other similar formatting enables the user to be better informed on how to address the issue.

As the user navigates the sidebar to explore the system's analysis and suggested fixes to identified errors or inconsistencies, the user may preview a particular fix. Once a fix is selected for preview, the system presents the preview to the user within the featured presentation. In this manner, the user is able to see the actual result of a possible change before committing to the edit. For example, if multiple numbers on a page are identified as multiple and conflicting slide numbers on the same page, the system would provide recommendations on removing certain numbers or selecting different positions for them. The user could then select one of these recommendations using the sidebar or through the pop-out recommendation text box. The system would then preview the selected fix on the featured presentation, moving the numbers identified as slide numbers in the system to their new recommended positions. Rather than just illustrating where such placement would be, the system allows the user to actually see where objects would move to as a result of a selected fix, a visualization that is key to such aesthetic and formatting decisions. Thus, the system provides the user with additional information on possible fixes to identified issues and whether or not it is better to ignore the issue or explore alternatives.

Once the user takes action on an identified issue by either fixing or ignoring it, the system catalogs that action in the presentation file. In some embodiments, a record of each action is preserved in the file as a user moves onto the next issue. The cataloging of issues allows the user to review and undo a particular action at any point before or after the review process. Furthermore, actions taken through the system may be preserved in the file so that others may review these actions and undo them if desired. For example, the system tracks ignored issues and enables the user to address them at a later point in time.

In some embodiments, the system functions as a software plug-in to augment existing presentation applications, such as Microsoft® Power Point or Apple® Keynote, Google® Slides, or the like.

In other embodiments, the system operates as part of a stand-alone presentation and review software.

An object of the invention is to provide an automated presentation review system that discovers inconsistencies and errors across a slide deck by comparing the unique characteristics of each slide in a presentation slide deck.

Another object of the invention is to provide a solution to the recurrent false positives generated by automated presentation review systems that analyze slide decks based on predetermined rules.

An additional object of the invention is to provide a solution to the lack of context provided to users when issues are identified in current automated presentation review systems.

Yet another object of the invention is to increase efficiency in presentation review and editing.

An advantage of the invention is that it analyzes each slide for unique information concerning slide content and formatting.

Another advantage of the invention is that it identifies errors and inconsistencies between the unique characteristics present in each slide through a presentation-wide comparison.

An additional advantage of the invention is that it can identify errors and inconsistencies within a presentation with and without predetermined criteria.

Yet another advantage of the invention is that it presents detailed information about errors and inconsistencies as well as their context and potential ways of fixing any issues in an accessible manner.

A further advantage of the invention is that it presents presentation reviews and analyses in a format that allows users to easily navigate through identified inconsistencies, learn about the inconsistencies, and make decisions about whether to fix or ignore them.

Another advantage of the invention is that it saves records of the user's actions in correcting or ignoring issues to the presentation file so that these actions may be shared, reviewed, or undone at any point during the review process.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Illustrating the concept using a Microsoft® PowerPoint® plug-in as an example, the drawing figures depict one or more implementations in accord with the present concepts, by way of example only, not by way of limitations. In the figures, like reference numerals refer to the same or similar elements.

FIGS. 6 and 7 are further GUIs of the system of FIG. 1, showing exemplary issues that may arise during review.

DETAILED DESCRIPTION OF THE INVENTION

Figure 1:
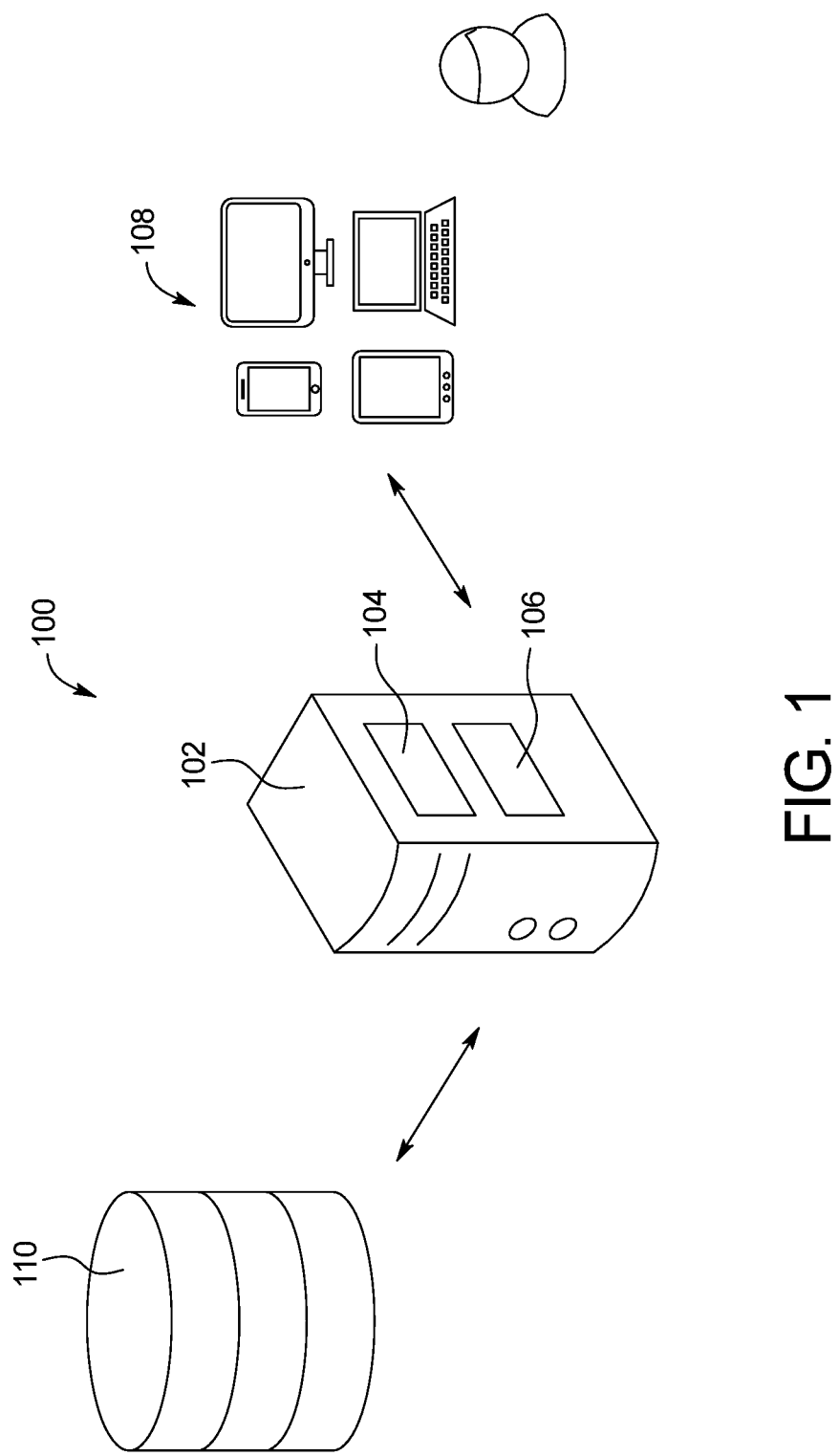
FIG. 1 is a schematic representation of an automated presentation review system described in the present application.

FIG. 1 is a schematic representation of an example of components of an automated presentation review system 100 (system 100). In the example shown in FIG. 1, the system 100 includes a server 102 including one or more controllers 104 and memory 106. The server 102 is in communication with one or more end user devices 108 and one or more databases 110. The server 102 and/or database 110 may be remote from or an integrated part of the end user device 108.

The features and functions of the system 100 are provided to users through one or more graphical user interfaces (GUIs) provided through appropriate input/output devices (e.g., mouse, keyboard, and display on a desktop computer, touchscreen, etc.) of the user devices 108. Typical end user devices 108 include smartphones, tablets, laptops, personal computers, kiosks, etc. In a typical embodiment, the one or more programs providing the GUIs to the users are hosted in the server 102. The server 102 includes one or more controllers 104 in communication with memory 106 including instructions that, when executed, cause the one or more controllers 104 to perform the various functions described herein. The memory 106 in communication with the controller 104 is further used to store data in and receive information from one or more databases 110, as shown in FIG. 1. For example, the various presentations to be reviewed described herein may be stored in the database 110 such that they are accessible to users through their end user devices 108. Similarly, pre-defined criteria, preset defaults, or other information to be used in analysis and evaluation of the system 100 may also be stored on the database 110. It is understood that the specific structure described above is merely one example of a structure that may be used to host and deploy the system 100. The memory 106 may be programmed with a presentation creation and editing application such as Microsoft® PowerPoint® or Apple® Keyword, or the system 100 may be in communication with an online tool such as Google® Slides. The memory 106 may also include program instructions that, when implemented, run the software component to analyze the user's presentations stored in database 110 and interact with errors and inconsistencies discovered in the automated review's analysis.

Representative example GUIs are illustrated in FIGS. 2-7 to provide the context for the explanation of the features and functions of the system 100. It is recognized that while there may be numerous UX designs that may be used to accomplish the objects and advantages of the system 100, there may be instances in which specific aspects of a given GUI are critical to accomplishing the objects and advantages of the invention. For example, it is contemplated that in some instances, a combination of specific displays and controls in a single interface of a GUI may be inventive subject matter. The user device 108 includes a display mechanism through which the GUIs are displayed.

Figure 2:
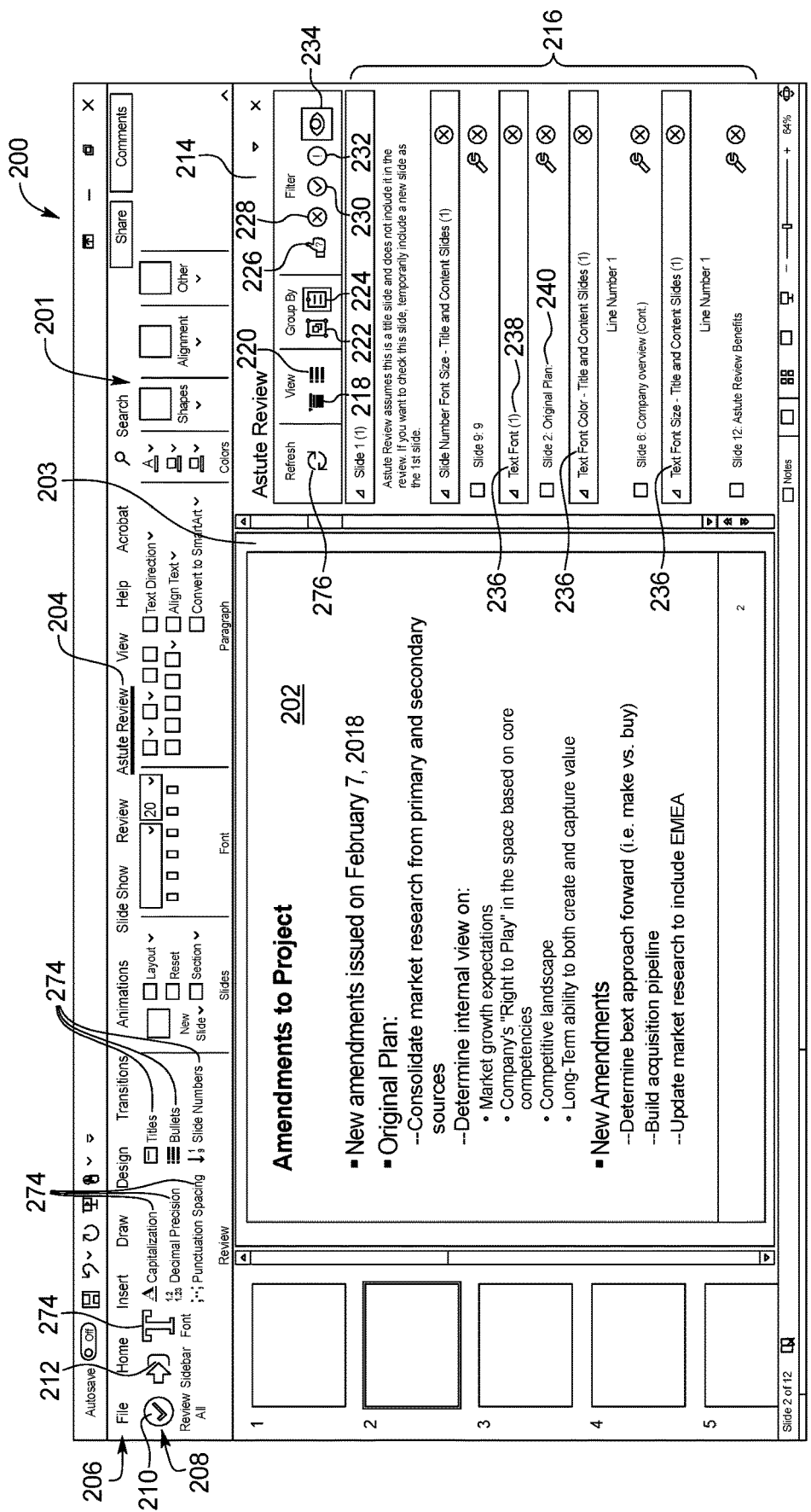
FIG. 2 is a graphical user interface (GUI) of the system of FIG. 1.

FIG. 2 shows an embodiment of the automated review system 100 as a plug-in to the basic GUI 200 of a preinstalled presentation creation and editing application Microsoft® PowerPoint®. The user device 108 includes a display mechanism through which the GUIs are displayed, and the presentation creation and editing application is displayed through the GUI. The GUI 200 includes a presentation review window 201, which includes a presentation display frame 203 featuring the presentation 202, and a review criteria tool 208. In this embodiment, a presentation 202 is open in the presentation creation and editing application. Selection of the plug-in tab 204 from the existing application's toolbar 206 causes the system's header or review criteria tool 208 to be displayed. The header 208 includes a plurality of buttons, including a plurality of review criteria options, that lead to further interaction. For example, selection of a review criteria option, such as the "Review All" button 210, causes the system 100 to perform a review of all slides of the presentation 202.

When the user selects one of the review criteria options, the system 100 performs an analysis on each slide within the presentation slide deck 202 open in the presentation application. The system 100 analyzes each slide in the presentation 202 and creates and compiles a dataset that consists of a catalog of each content and formatting decision for each object within each slide of the presentation, including font, text, alignment, and other such content and formatting characteristics. The system 100 then applies a statistical analysis to the dataset in order to identify potential inconsistencies and calculate actions that could fix such inconsistencies. In some embodiments, the inconsistencies are based on the prevalence of specific formatting selections and differences therefrom. For example, in analyzing the content and formatting decisions associated with each object, the system 100 may identify any decision associated with an object that is different than a prevalent decision associated with similar or like objects, or the statistical analysis may identify inconsistencies based on a margin of error determined by a confidence interval or a median/mode value of content and formatting decisions relative to such decisions of similar or like objects. In other embodiments, the inconsistencies may be derived from comparison of the formatting against user-defined default settings or a pre-approved corporate standard.

When the system 100 identifies inconsistencies, it further analyzes these inconsistencies to extrapolate issue type, number of similar issues identified throughout the presentation, location of similar issues across the presentation, issue context, and recommended fixes to the issues. Selection of the "Sidebar" button 212 in the header 208 causes the results display frame 214, in this case, a sidebar window, to appear, displaying the results 216 of the review of the user's presentation 202.

The sidebar window 214 allows the user to display the results 216 in various views. The user can expand or collapse the list through buttons 218 and 220, respectively. The user may view the results 216 grouped by slide through button 222 (and shown in FIG. 3) or by issue type through button 224 (and shown in FIG. 2). The sidebar 214 also allows the user to filter the results 216 to show unfixed options only, to show ignored issues only, to show fixed/changed issues only, to show warnings only, or to show all through buttons 226, 228, 230, 232, 234, respectively. In one embodiment, the system 100 tracks the status of issues so that when a file is transferred to another party and is returned to the original user or saved under a different name, the user may view ignored/unfixed, fixed/changed, or all issues. In another embodiment, the system tracks ignored issues over time and through saves and reviews by others, enabling the user to address them at a later point in time.

Figure 3:
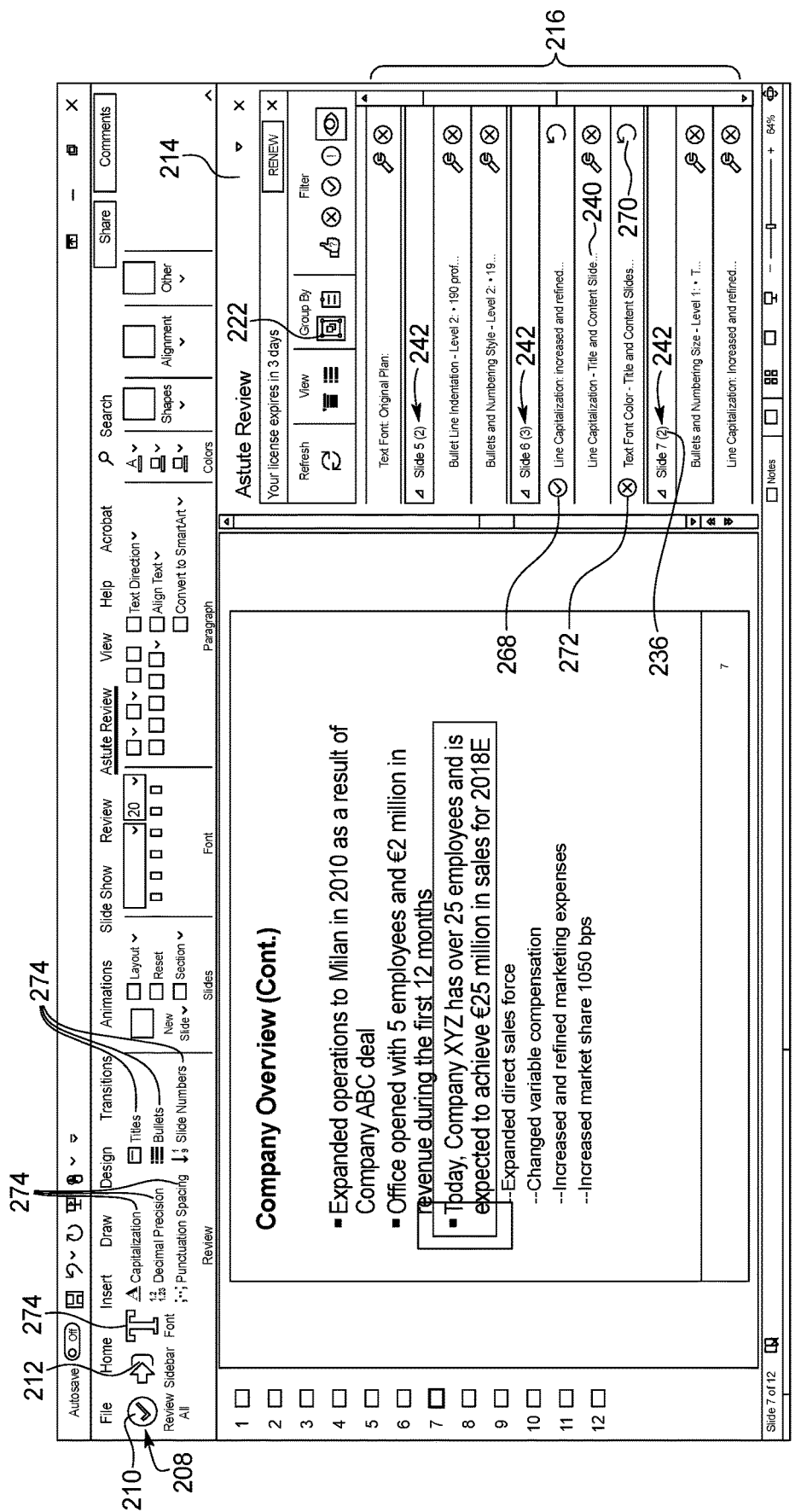
FIG. 3 is a further GUI of the system of FIG. 1, showing various information available through the sidebar.

With button 224 selected, the sidebar 214 shown in FIG. 2 features a list of the issues by issue type or category 236. The listing of the results 216 notes the number of issues identified 238 for a given issue category 236, allowing the user to select the issue category in order to see additional detailed information about the errors in the given category. Each line item issue 240 provides the context of the issue, including issue type and relevant text. Referring to FIG. 3, the sidebar 214 may provide a list of the issues by slide 242, button 222 having been selected. By selecting a slide 242, the user can view a list of the issues of that slide 242, selection of which leads to addition information including the context of the issue, including issue type and relevant text.

Figure 4:
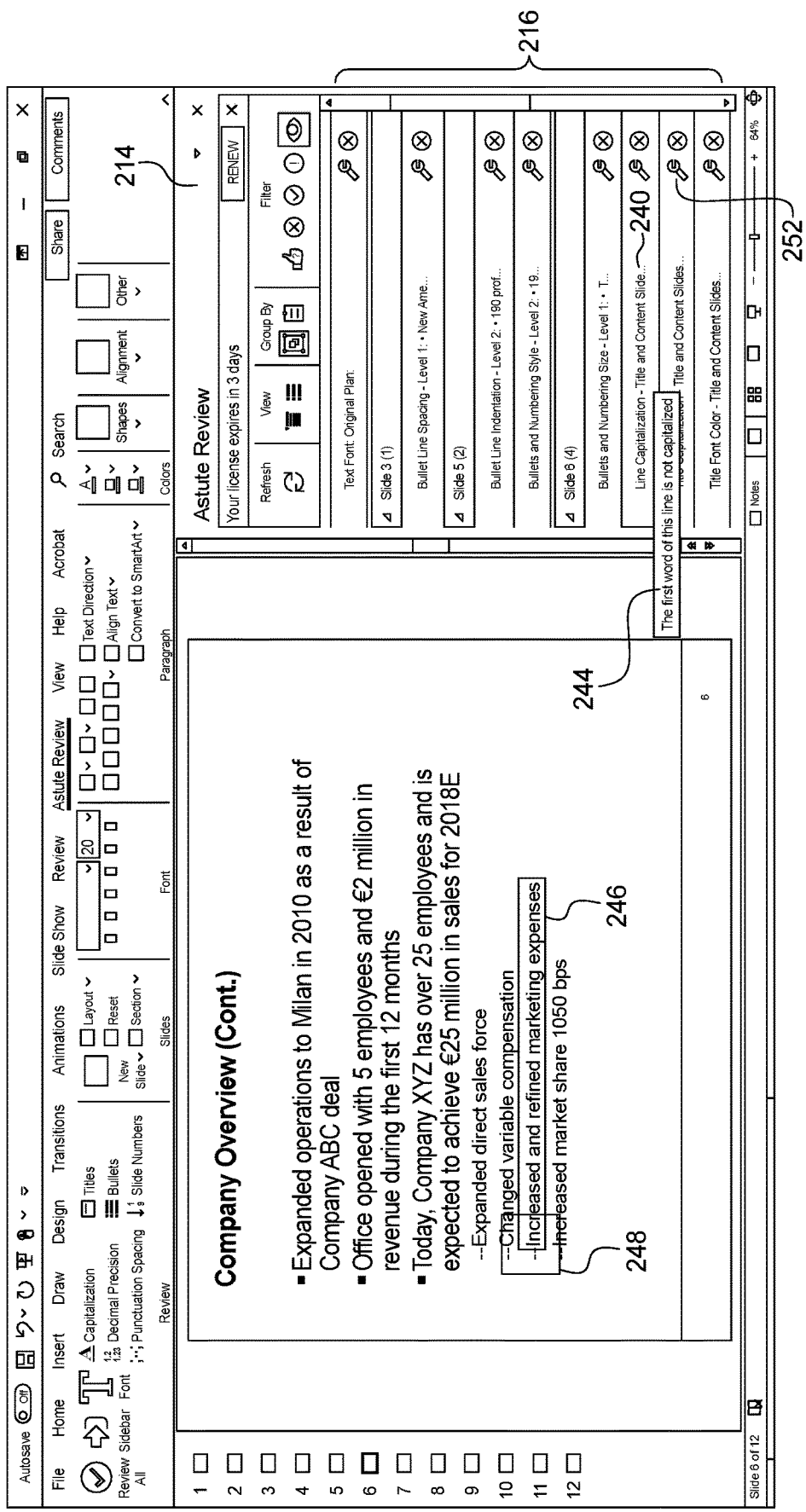
FIG. 4 is a further GUI of the system of FIG. 1, showing additional information related to an issue upon selection of a line item issue in the sidebar.
Figure 5:
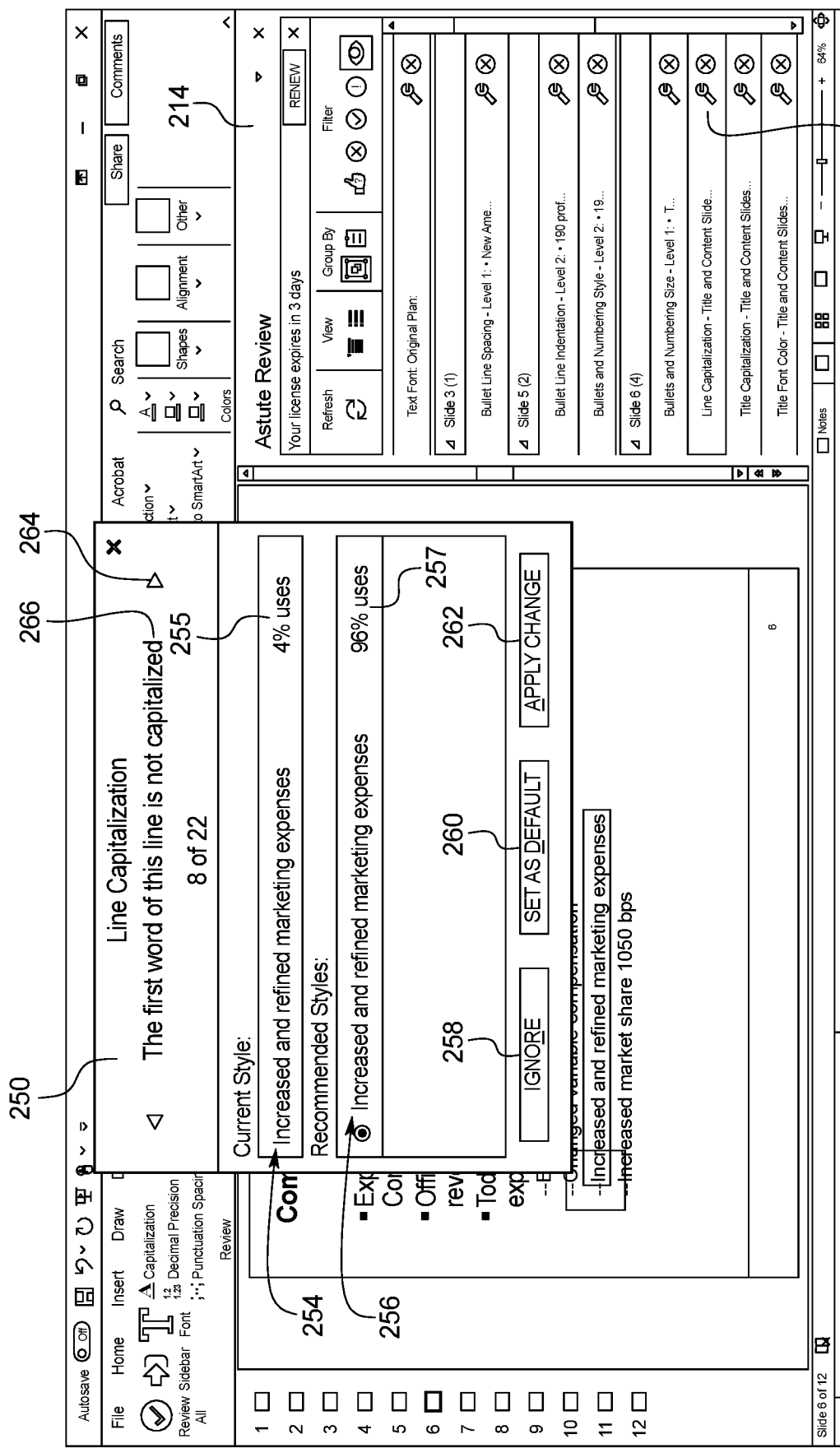
FIG. 5 is a further GUI of the system of FIG. 1, showing a correction menu.

Additionally, the user can easily jump to issues within the presentation by selecting links provided in the sidebar 214, as shown in FIGS. 4 and 5. Each line item issue 240 is provided with a link accessible through a selectable icon. In FIG. 4, a description 244 of the issue appears when the cursor hovers over the line item issue 240. In the illustrated embodiment, the system 100 utilizes animation to draw the user's attention to the issue within the presentation 202. Selection of the line item issue 240 causes a first object or box 246 to appear on the slide, which highlights the slide object that includes the issue. A second object or box 248 also appears to highlight the exact location of the issue within the first box 246.

FIG. 5 illustrates a pop-up correction menu 250 that appears upon selection of the wrench icon 252 for the issue 240 in the sidebar 214. The correction menu 250 provides details about the relevant issue, including the current style 254, the frequency 255 of the current style throughout the presentation 202, one or more alternative styles 256, and the frequency 257 of those alternative styles throughout the presentation 202. The correction menu 250 also presents a fix description 266 that provides the user with specific details associated with the recommended style fix. The user may also ignore the issue, set the selected presentation as a default, and apply the recommended change through buttons 258, 260, and 262, respectively. When the user selects the option to set the selected presentation style as default, the system 100 will update the review and results 216 to search against the updated default. Separately, when viewing the results 216 in the sidebar 214, selection of the wrench icon 252 shown adjacent to an identified issue 240 causes the presentation 202 to jump to the relevant slide.

The correction menu 250 also allows users to cycle through issues 240 of the results 216 by clicking arrow icons 264. When the user selects one of the ignore button 258, set as default button 260, or apply change button 262, the correction menu 250 cycles to the next line item issue 240 of the results list 216.

Referring to FIG. 3, a checkbox indicator 268 appears next to a line item issue 240 once the user has addressed the issue. An undo icon 270 is shown adjacent to the fixed line item issue 240 in the sidebar 214. Selection of the undo icon 270 reverts the line item to its original warnings. If the user selects the ignore button 258 in the correction menu 250, an "x" indicator 272 appears next to the line item issue 240, along with an undo icon 270 in case the user wants to fix the issue at a later point.

Referring back to FIG. 2, the header 208 includes alternatives to the "Review All" button 210. The user may select buttons 274 to review for the entire presentation 202 for single error categories such as font, capitalization, decimal precision, punctuation spacing, titles, bullets, and slide numbers. For example, reviewing font-related inconsistencies, the system 100 analyzes the content of the slides for consistencies in font size and color by text, title, and slide numbering. In one embodiment, font color mismatch is benchmarked against the presentation and not the color palette. In this case, the system 100 provides recommendations based on prevalence. Using other settings, the system 100 may provide alternative options using the color palette. The bullet error category reviews paragraph spacing, indentation, font size, bullet style, and bullet size. While the inconsistencies are found based on prevalence throughout the presentation 202, users are able to address issues on an individual slide basis. Other embodiments of the system 100 may allow for reviewing of other specific features as desired. In one example, the punctuation spacing category features a text wrapping check, wherein the system 100 identifies a text box having a word split into two lines. For some inconsistencies or errors such as text wrapping, the system 100 highlights the inconsistency without providing alternative solutions.

The sidebar 214 also includes the option to refresh the review through button 276. Further, as changes are made throughout the process, a pop-up screen may appear to prompt the user to refresh. The system 100 also provides the option to fix all issues as well as to ignore all issues throughout all error categories as well as within individual error categories.

Figure 6:
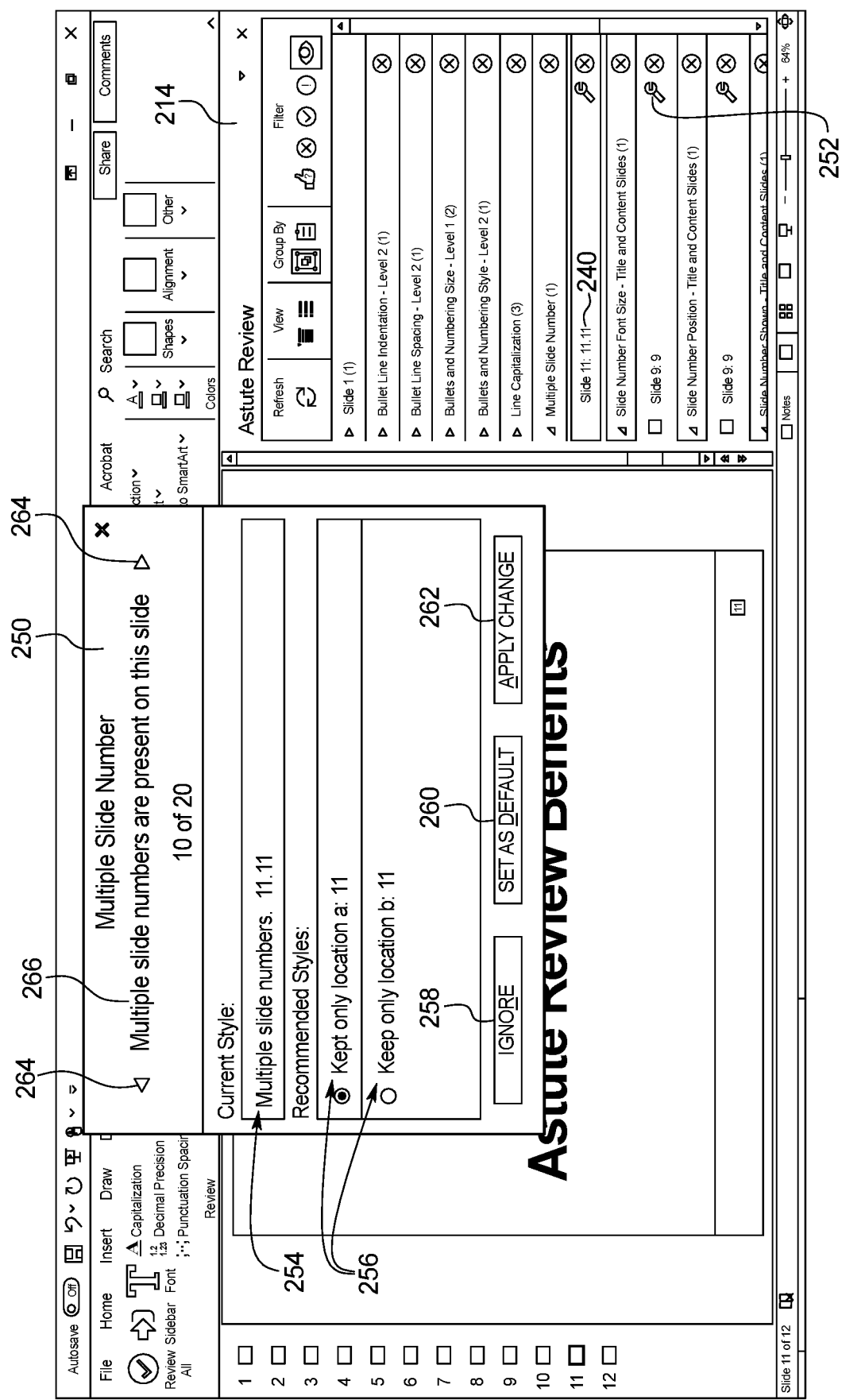

Limiting the review to the slide numbers category, the system 100 evaluates the slide numbers throughout the presentation 202 for consistencies in slide number duplication, font size, position, and existence (i.e., if a slide number is missing). FIG. 6 illustrates a slide numbering issue. In the example, slide 11 is numbered twice. After analyzing other slides in the presentation, the system 100 determined that the slide was numbered incorrectly. The system 100 noted the error in the sidebar 214, highlighted the error once the line item 240 was selected, and presented the user with corrective actions in the correction menu 250.

Figure 7:
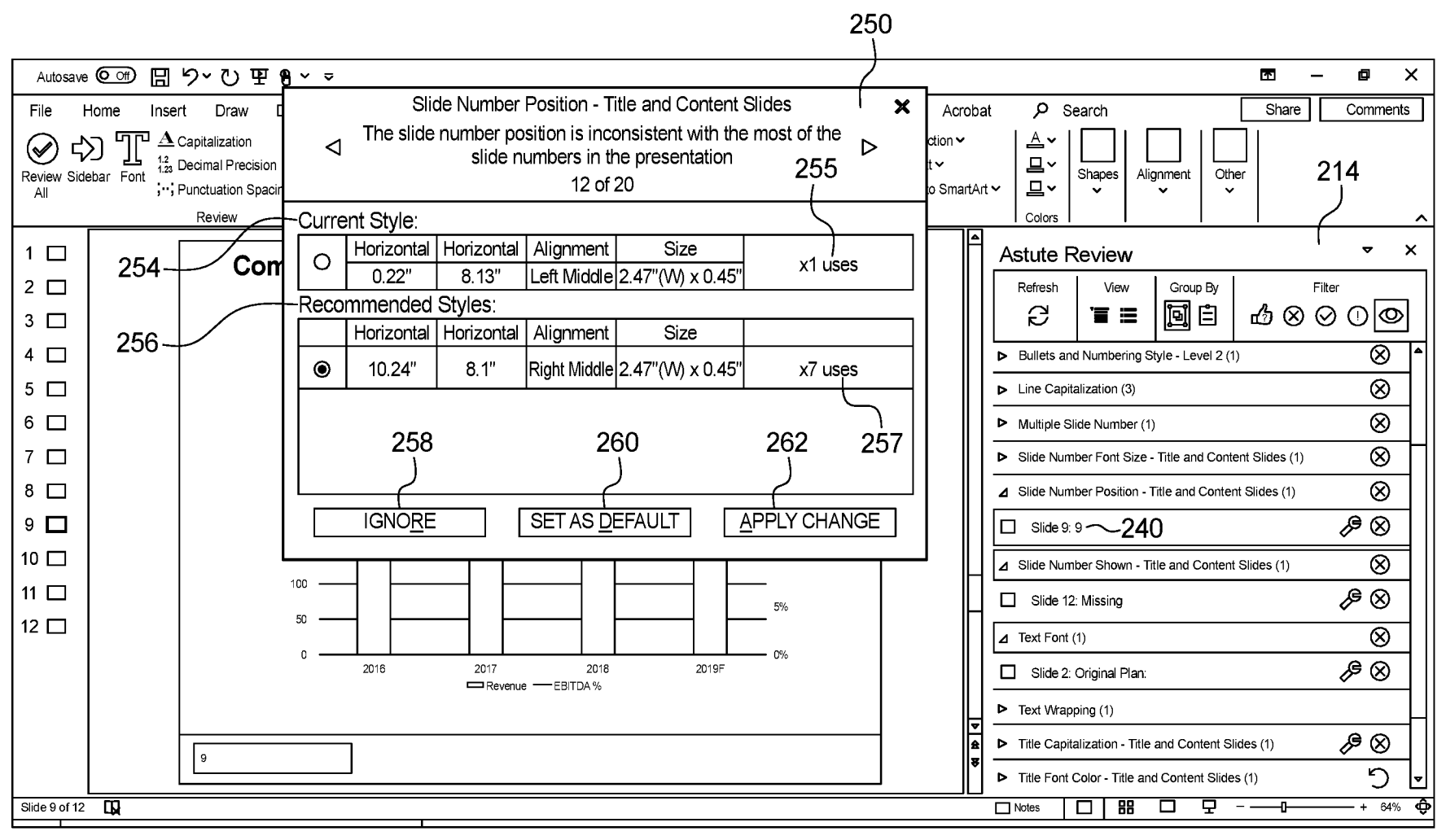

FIG. 7 illustrates the system's ability to evaluate positioning of a slide object against other similar objects or a user-defined/preset standard. In this example, the system 100 has noted that a slide number position is inconsistent with the positioning of other slide numbers within the presentation. The system 100 has noted, cataloged, and presented this issue in the sidebar 214. Once the user has selected the wrench icon 252 for this line item issue 240 in the sidebar 214, the system 100 presents the user with the correction menu 250 that provides specific horizontal and vertical measurements used in the incorrect alignment as well as other precise measurement options used throughout the presentation that could resolve the identified inconsistency.

Under the title error category, the system 100 analyzes the content of the presentation for title capitalization, font color, font size, and position. For example, a line item issue is created if all words in one title are capitalized whereas the remaining titles have only the first word capitalized. The system 100 enables individual placements of title position, meaning that the user can choose different positions on each slide within the presentation 202 based on prevalence.

In some embodiments, the system 100 provides the user with the option to apply suggested changes throughout the document while simultaneously giving the user the option to retain specific instances of unmodified formatting, or, in the reverse, giving the user the option to select specific instances to modify while leaving the remainder of the related suggested fixes unfixed. For example, the system may present a fix-all option for the user to change any non-Times New Roman font to be Times New Roman. The fix-all option identifies each instance of the font being other than Times New Roman so that the user can select fix all and then deselect any instance that he would like to retain the non-Times New Roman font, or the user can select individual fixes rather than the fix-all option altogether. The fix-all feature of the present system allows the user to tailor how broadly the system's recommended fixes are applied throughout the presentation.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A presentation review system comprising:
 a controller in communication with a user device, the user device comprising an input mechanism and a display mechanism;
 a memory coupled to the controller, wherein the memory is configured to store program instructions executable by the controller;
 wherein in response to executing the program instructions, the controller is configured to:
  display a graphical user interface through which a presentation review window is displayed, wherein the presentation review window simultaneously provides:
   a presentation display frame displaying a presentation comprising plurality of presentation slides;
   a review criteria tool displaying a plurality of review criteria options; and
   a results display frame;
  receive a selection one or more review criteria options from the plurality of review criteria options;
  in response to the receipt of the selected review criteria options, display results of an analysis of the presentation based on the selected review criteria options, wherein the display of the analysis includes one or more inconsistencies identified in the presentation across the plurality of presentation slides;
  receive a user selection of one of the one or more inconsistencies;
  in response to the user selection of one of the one or more inconsistencies, display a correction menu including a current style, an indication of frequency the current style within the presentation, an alternative style, and an indication of frequency of the alternative style within the presentation; and
  in response to a user style selection from the current style and the alternative style, revise the selected style of the inconsistency.

2. The system of claim 1, wherein the controller is further configured to:
 analyze each object within the plurality of slides; and
 generate a dataset including each content and formatting decision associated with each object in the plurality of slides.

3. The system of claim 2, wherein the controller is further configured to statistically analyze the dataset to define the one or more inconsistencies, wherein each inconsistency comprises an inconsistency between content and formatting decisions associated with like objects in the plurality of slides.

4. The system of claim 3, wherein the step of statistically analyzing the dataset comprises the step of calculating a confidence interval related to each inconsistency.

5. The system of claim 2, wherein the controller is further configured to:
 receive a plurality of settings; and
 analyze the dataset of decisions against the plurality of settings, wherein each inconsistency comprises an inconsistency between a content and formatting decision associated with an object and one of the plurality of settings.

6. The system of claim 1, wherein the plurality of review criteria options includes one or more of the following: a font error category, a capitalization error category, a decimal precision error category, a punctuation spacing error category, a titles error category, a bullets error category, and a slide numbers error category.

7. The system of claim 6, wherein the display of the analysis further includes a fix all option and an ignore all option.

8. The system of claim 1, wherein the controller is further configured to:
 in response to the user selection of one of the one or more inconsistencies, display a first object within the presentation that identifies the object featuring the selected inconsistency and a second object within the presentation that identifies the selected inconsistency.

9. The system of claim 1, wherein the display of the first and second objects is animated.

10. The system of claim 1, wherein the controller is configured to:
 display an ignore option associated with each of the one or more inconsistencies; and
 in response to receiving a user selection of the ignore option, catalog a dataset of ignored inconsistencies.

* * * * *